United States Patent
Gamache

(10) Patent No.: US 11,971,290 B2
(45) Date of Patent: Apr. 30, 2024

(54) WATER SUBMERSION DETECTION SWITCH

(71) Applicant: The United States of America, as represented by the Secretary of the Navy, Arlington, VA (US)

(72) Inventor: Raymond Mark Gamache, Salinas, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/524,120

(22) Filed: Nov. 11, 2021

(65) Prior Publication Data

US 2023/0054018 A1 Feb. 23, 2023

Related U.S. Application Data

(60) Provisional application No. 63/113,765, filed on Nov. 13, 2020.

(51) Int. Cl.
| | |
|---|---|
| *G08B 21/18* | (2006.01) |
| *G01F 23/68* | (2006.01) |
| *G01F 23/76* | (2006.01) |
| *G08B 21/08* | (2006.01) |

(52) U.S. Cl.
CPC ........... *G01F 23/683* (2013.01); *G01F 23/76* (2013.01); *G08B 21/182* (2013.01); *G08B 21/088* (2013.01)

(58) Field of Classification Search
CPC ...... G01F 23/683; G01F 23/76; G01F 23/242; G01F 23/0007; G01F 23/30; G01F 23/64; G01F 23/68; G01F 23/686; G01F 23/0038; G08B 21/182; G08B 21/088
USPC ........... 73/305–308, 313; 340/603, 604, 612, 340/618, 623; 200/52 R, 61.04
See application file for complete search history.

(56) References Cited

U.S. PATENT DOCUMENTS 4,203,097 A * 5/1980 Manning ................... E04H 4/06
340/623
8,319,124 B1 * 11/2012 Wang .................. G01F 23/0007
200/84 R

FOREIGN PATENT DOCUMENTS

CN 210981440 U * 7/2020

* cited by examiner

*Primary Examiner* — Robert R Raevis
(74) *Attorney, Agent, or Firm* — Naval Postgraduate School; Scott Bell

(57) ABSTRACT

A water submersion detection system that may include a buoyant device having a conductive surface, and a housing enclosing the buoyant device and having conductive elements. The conductive elements may include a first set of one or more nonadjacent conductive elements that are electrically connected, and a second set of one or more nonadjacent conductive elements that are electrically connected. The system may include a submersion alert device that activates responsive to the buoyant device contacting the housing.

17 Claims, 3 Drawing Sheets

WATER SUBMERSION DETECTION SWITCH

CROSS-REFERENCE

This Application is a nonprovisional application of and claims the benefit of priority under 35 U.S.C. § 119 based on U.S. Provisional Patent Application No. 63/113,765 filed on Nov. 13, 2020. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Research and Sponsored Programs Office, Halligan Hall, Room 230, Naval Postgraduate School, Monterey, CA 93943-5138, research@nps.edu, referencing NPS Case No. 20200014.

TECHNICAL FIELD

The present disclosure is related to a water submersion detection system that can be activated responsive to being at least partially submerged in a liquid.

BACKGROUND

Prior art technology does not exist for a type of sensor to enable a device to be deployed when the sensor is placed within water beneath the water line. For example, for body armor, the density of the plates causes the armor to become an anchor if a person falls off of a vessel into the water. Current technology only incorporates a manual control to be pulled by user to enable self-inflating of a buoyant system. Current systems can use foam attached to body armor plates, but this increase bulk and reduces mobility. Prior art systems can also include buoyant body armor, but there is decreased strength with this type of armor.

In view of the above, there exists a need for a solution to reduce bulk, increase mobility, and automatically inflate when placed in the water.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

Aspects described herein provide for a water submersion detection system that can be activated responsive to being at least partially submerged in a liquid.

The present disclosure provides for a water submersion detection system that may include a buoyant device having a conductive surface, and a housing enclosing the buoyant device and having conductive elements. The conductive elements may include a first set of one or more nonadjacent conductive elements that are electrically connected, and a second set of one or more nonadjacent conductive elements that are electrically connected. The system may include a submersion alert device that activates responsive to the buoyant device contacting the housing.

The present disclosure provides for a water submersion detection device that may include a buoyant sphere having a conductive surface, and a cage system enclosing the buoyant sphere and having conductive rods arranged in a spherical shape. The conduct rods may include a first set of one or more nonadjacent rods that are electrically connected, and a second set of one or more nonadjacent rods that are electrically connected. The water submersion detection device may include a submersion switch that activates responsive to the buoyant sphere contacting the cage system.

The present disclosure provides for a water submersion detection device that may include a buoyant sphere having a conductive surface, and a cage system enclosing the buoyant sphere and having conductive rods arranged in a spherical shape. The conductive rods may include a first plurality of nonadjacent rods that are electrically connected, and a second plurality of nonadjacent rods that are electrically connected. The water submersion detection device may include a submersion switch that activates when the buoyant sphere contacts the first and second plurality of nonadjacent rods.

DETAILED DESCRIPTION

The aspects and features of the present aspects summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present disclosure provides for a water submersion detection system that has one or more components that may activate or turn on responsive to being at least partially submerged or in contact with a liquid.

Figure 1:
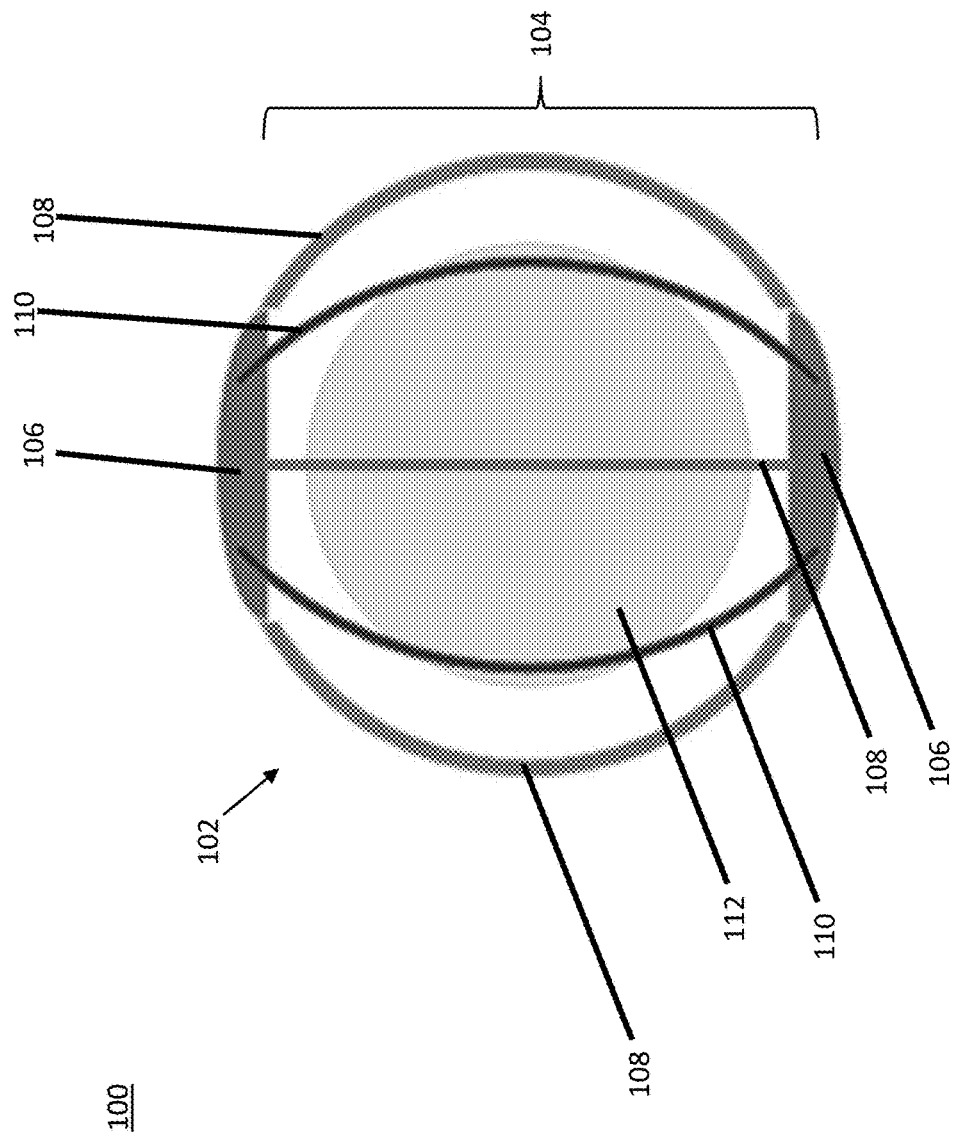
FIG. 1 illustrates an exemplary buoyant system, in accordance with one or more disclosed aspects.

FIG. 1 illustrates an exemplary buoyant system 100 in accordance with disclosed aspects. Buoyant system 100 may include a housing 102 and a buoyant device 112, which may be contained inside of the housing 102. In one example, the housing 102 may be a cage system 104 enclosing the buoyant device 112, where the overall dimensional size of the buoyant device 112 may be smaller than the overall dimensional size of the inside of the housing 102.

The housing 102 may include cap elements 106 and one or more respective elements 108, 110 forming an outer portion of the housing 102. For example, the housing 102 may include a first set of one or more nonadjacent conductive elements 108. When there may be more than one element 108, the elements 108 may be electrically connected to each other, such as via a connection point at each cap 106.

The housing 102 may include a second set of one or more nonadjacent conductive elements 110. When there may be more than one element 110, the elements 110 may be electrically connected to each other, such as via a connection point at each cap 106. According to some aspects, the elements 108 and 110 might not be electrically connected to each other in a configuration of buoyant system 100. In some cases, the elements 108 and 110 might be electrically connected after the buoyant device 112 contacts at least one element 108 and at least one element 110, such as to make an electrical connection. According to some aspects, electrically connected can include when a current is capable of flowing through the associated elements.

According to the present disclosure, the buoyant system 100 can be used to detect when a human or object (e.g., package) has been submerged at least partially beneath the surface of water. The buoyant system 100 can include a highly buoyant sphere as the buoyant device 112, which when submerged can provide a buoyant force towards the water surface. The sphere can have a conductive surface. The sphere can be placed within a cage system housing 104 incorporating conductive rods (conductive elements 108, 110) formed into a circular/spherical shape, such as in a symmetrical arrangement. The conductive rods can be placed around in the azimuthal direction every specified angular specification (e.g., every 30 degrees). In some cases, the rods can be placed at uneven angular spacings. According to some aspects, the total sum of the rods can an even number. The conductive rods can be electrically isolated where all odd rods (e.g., elements 108) are connected together, and all even numbered rods (e.g., elements 110) are all electrically connected.

Figure 2:
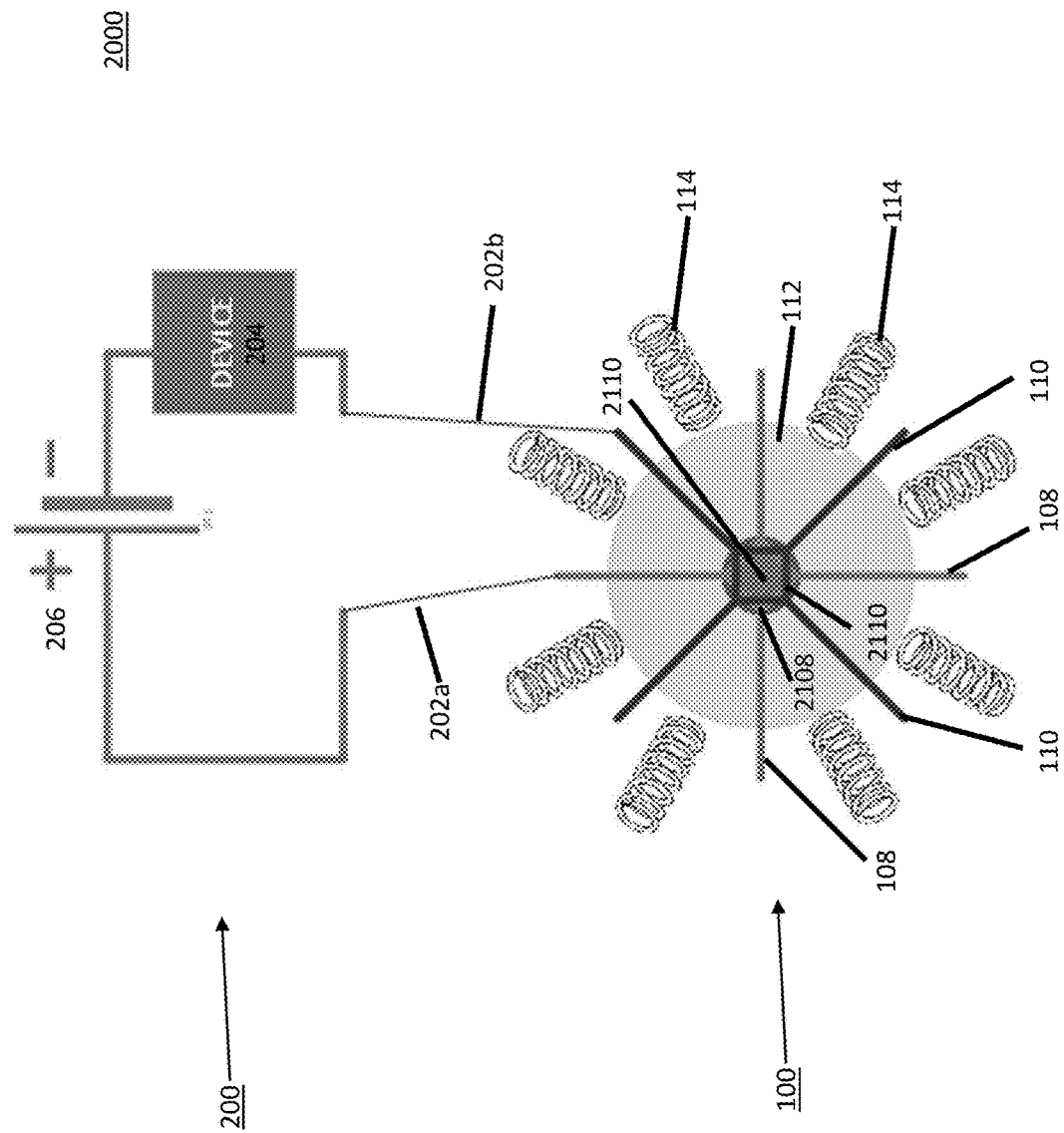
FIG. 2 illustrates an exemplary water submersion detection system, in accordance with one or more disclosed aspects.

FIG. 2 illustrates an exemplary water submersion detection system 2000 in accordance with disclosed aspects. System 2000 may include buoyant system 100 and submersion detection device 200.

As shown in FIG. 2, buoyant system 100 may include one or more fixing elements 114, which may extend out from an outer surface of the housing 102 toward the hollow center of housing 102 to position the buoyant device 112 inside of the housing 102. For example, the fixing elements 114 might fix the buoyant device 112 in a position such that the buoyant device 112 might not be in contact with the elements 108 and 110. In some embodiments, the fixing elements 112 may be made of a compressible material that is placed between the conductive elements 108, 110 and the buoyant device 112. For example, the fixing elements 112 may be springs that can move back and forth responsive to motion and/or force, such as from the buoyant device 112.

In one example, the buoyant device 112 may have a submersion buoyancy so that the buoyant device 112 contacts the housing 102 (e.g., the elements 108, 110) when the buoyant device 112 is at least partially submerged. In this case, the force from the water may push on the buoyant device 112, and the buoyant device 112 may push on one or more of the elements 114. The one or more elements 114 may compress, which may allow the buoyant device 112 to come in contact with the housing 102.

In another example, the one or more fixing elements 114 may be comprised of dissolvable material, which might dissolve when coming into contact with a substance, such as water. For example, after one or more of the elements 114 becomes wet (such as after at least partially being submerged), the elements 114 may dissolve, which may allow movement of the buoyant device 112 allowing the buoyant device 112 to come in contact with the housing 102 (e.g., the elements 108, 110).

In some embodiments, the conductive elements 108 may be electrically connected to each other, and the conductive elements 110 may be electrically connected to each other, such as at respective connection points 2108, 2110 at each cap 106. As shown in FIG. 2, the connection points 2108 and 2110 may be formed in a square shape (but can be any shape or in any form), and may each connect to each respective element 108, 110.

Submersion detection device 200 may include a submersion alert device 204 coupled to a power source 206, such as in a series arrangement. The submersion alert device 204 can be a switch that can be closed or open and/or off or on. In some embodiments, the submersion alert device 204 may be a Boolean-enabled device that may provide a true or false value.

The buoyant system 100 may be coupled to and/or connect to a submersion detection device 200. In some embodiments, one of the conductive elements 108 may connect at a connection point 202a to the submersion detection device 200, and one of the conductive elements 110 may connect at a connection point 202b to the submersion detection device 202. In one example, the connection point 202a may be at a terminal of the power source 206 (e.g., the positive terminal of the power source 206), and the connection point 202b may be at the submersion alert device 204.

According to aspects described herein, before the submersion detection system 2000 is submerged (e.g., at least partially submerged) in a fluid, the conductive elements 108 are electrically isolated from the conductive elements 110. After the submersion detection system 2000 is at least partially submerged, the conductive device 112 may come into contact with at least one of the conductive elements 108 and at least one of the conductive elements 110.

After this contact, a conductivity may be enabled between the conductive elements 108 and the conductive elements 110. The conductive elements 108 and the conductive elements 110 may be connected to the submersion detection device 200, which may be configured to active the submersion alert device 204 when the conductive elements 108, 110 are electrically connected (e.g., after the submersion detection system 2000 is at least partially submerged).

According to some aspects, the submersion alert device 204 may be, may be part of, and/or may be coupled to a safety device, which may activate (e.g., provide a true value, turn on, close, etc.) when the conductive elements 108, 110 are electrically connected. For example, the safety device comprises a flotation device that deploys after the submersion alert device 204 is activated. In another example, the safety device comprises a signaling device that transmits a beacon after the submersion alert device 204 is activated, such as to send a distress signal or to trigger activation of another device (via the beacon). The power source 206 may provide a voltage to the submersion alert device 204.

The size of the system 2000 can be small, such as a few millimeters in diameter, as long as the buoyant force is maintained.

The present disclosure provides, in one example, for a body armor protection system for personnel on maritime vessels that provides for situations of when the personnel may be knock off a vessel and/or unconscious. In such situations, the personnel can rely on a safety device (e.g., light, beacon, vest, flotation device, etc.) to automatically activate/deploy when at least partially submerged in water. For example, when activated, the submersion alert device 204 can cause gas to be released into a flotation device, which can help support a person or package in the water. A cartridge can be coupled to the submersion alert device 204, and the cartridge can release gas (carbon dioxide) for the flotation device.

Figure 3:
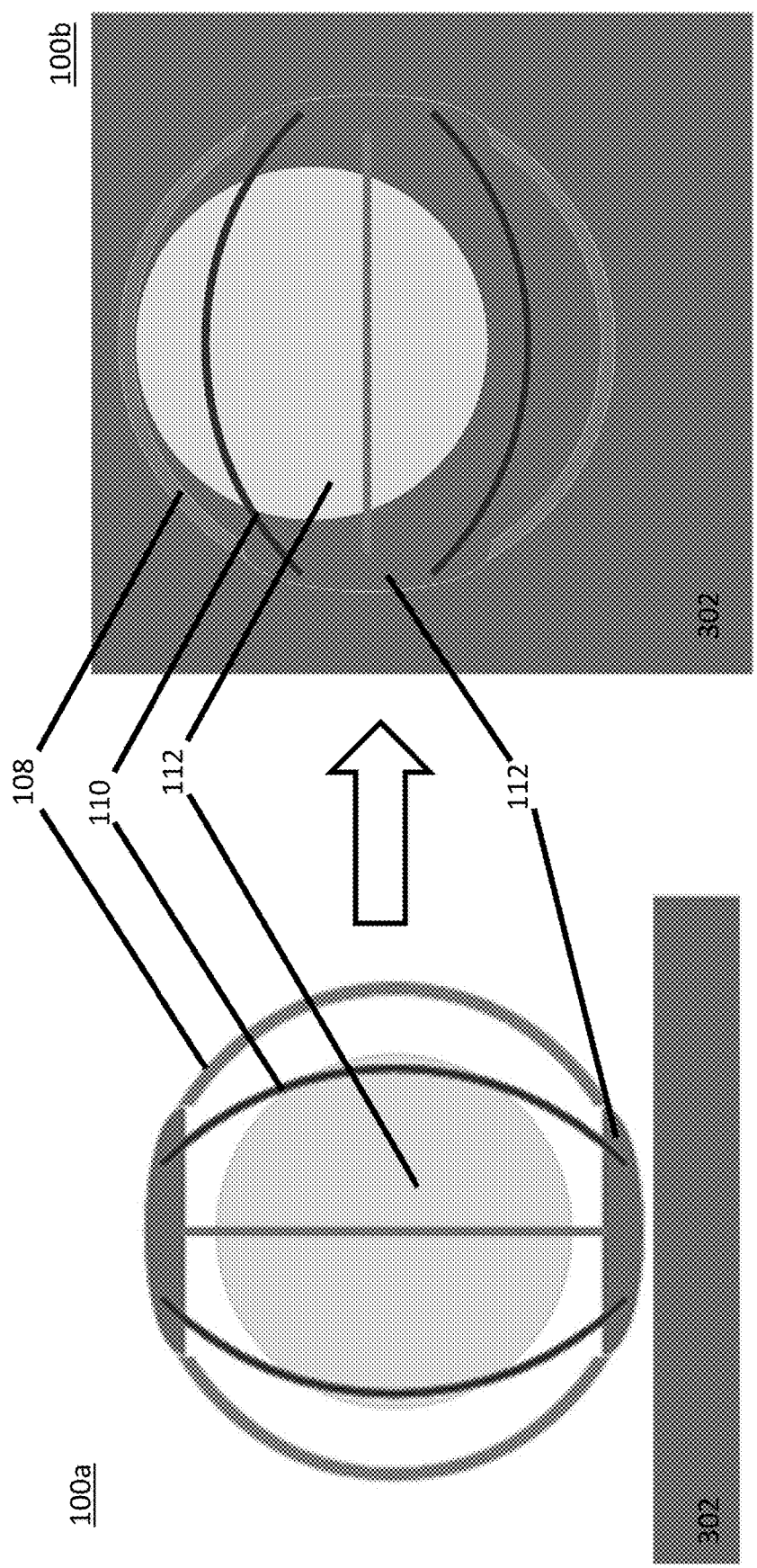
FIG. 3 shows an exemplary response of the buoyant system before and after the buoyant system is at least partially submerged, in accordance with one or more disclosed aspects.

FIG. 3 shows an exemplary response of the buoyant system 100a before and after the buoyant system 100b is at least partially submerged. For example, FIG. 3 illustrates the buoyant system 100a having conductive elements 108 and 110, where the buoyant device 112 is not in contact with the conductive elements 108 and 110. This state may be a state where the buoyant system 100a might not be at least partially submerged in a fluid 302.

According to some aspects, the separation of the buoyant device 112 from the conductive elements 108, 110 may be provided by one or more fixing elements, such as spring(s), soft and/or compressible materials, sponges, dissolvable materials, and the like. The force of the fixing element may be less than the buoyant force of the buoyant device 112 when placed beneath the water line. In one example, the buoyant device 112 is designed and made with a low mass while having the large volume within the design constraints.

FIG. 3 illustrates a state of the buoyant system 100b after being at least partially submerged in the fluid 302. As shown, the buoyant device 112 the may provide a buoyant force toward the water surface, which may cause the buoyant device 112 to come into contact with the conductive elements 108, 110. This can cause the submersion alert device 204 (FIG. 2) to activate (e.g., for activation of air deployed life preservers, signaling beacons, etc.).

A water submersion detection system (and method of use) that can be activated responsive to being at least partially submerged in a liquid has been described. Although particular embodiments, aspects, and features have been described and illustrated, one skilled in the art would readily appreciate that the aspects described herein is not limited to only those embodiments, aspects, and features but also contemplates any and all modifications and alternative embodiments that are within the spirit and scope of the underlying aspects described and claimed herein. The present application contemplates any and all modifications within the spirit and scope of the underlying aspects described and claimed herein, and all such modifications and alternative embodiments are deemed to be within the scope and spirit of the present disclosure.

What is claimed is:

1. A water submersion detection system comprising:
   a buoyant device having a conductive surface;
   a housing enclosing the buoyant device and having conductive elements, the conductive elements further comprising:
      a first set of conductive elements that are electrically connected and nonadjacent in an azimuthal direction, and
      a second set of conductive elements that are electrically connected and nonadjacent in the azimuthal direction; and
   a submersion alert device that activates responsive to the buoyant device electrically connecting the first set of nonadjacent conductive elements and the second set of nonadjacent conductive elements.

2. The detection system of claim 1, further comprising one or more dissolvable devices positioned between the conductive elements and the buoyant device, wherein at least one of the one or more dissolvable devices dissolves when at least partially submerged allowing movement of the buoyant device.

3. The detection system of claim 1, further comprising compressible material between the conductive elements and buoyant device.

4. The detection system of claim 3, wherein the compressible material moves responsive to a force associated with the buoyant device when the buoyant device is at least partially submerged.

5. The detection system of claim 1, wherein the buoyant device has a submersion buoyancy so that the buoyant device contacts the housing when the buoyant device is at least partially submerged.

6. The detection system of claim 1, wherein the buoyant device has a submersion buoyancy so that the buoyant device contacts the first and second sets of conductive elements when the buoyant device is at least partially submerged.

7. The detection system of claim 1, wherein the submersion alert device is coupled to a safety device, wherein activation of the submersion alert device causes activation of the safety device.

8. The detection system of claim 7, wherein the safety device comprises a flotation device that deploys after the submersion alert device is activated.

9. The detection system of claim 7, wherein the safety device comprises a signaling device that transmits a beacon after the submersion alert device is activated.

10. The detection system of claim 1, wherein the first set of conductive elements are spaced apart in the azimuthal direction at a first specified angular specification.

11. The detection system of claim 10, wherein the second set of conductive elements are spaced apart in the azimuthal direction at a second specified angular specification.

12. The detection system of claim 1, wherein the first set of conductive elements is electrically isolated from the second set of conductive elements prior to the buoyant device contacting the housing.

13. The detection system of claim 1, wherein the first set of conductive elements is electrically connected to the second set conductive nonadjacent elements after the contact by the buoyant device.

14. The detection system of claim 1, wherein the buoyant device comprises a buoyant sphere and the housing is a cage system enclosing the buoyant sphere, and the conductive elements arranged in a spherical shape.

15. The detection system of claim 1, further comprising a power source coupled to (i) the submersion alert device and to (ii) the first set of conductive elements or the second set of conductive elements.

16. The detection system of claim 1, wherein the submersion alert device comprises a logical device configured to output a Boolean value.

17. The detection system of claim 1, wherein the submersion alert device comprises a switch.

* * * * *